(12) United States Patent
Galonska et al.

(10) Patent No.: US 6,428,017 B1
(45) Date of Patent: Aug. 6, 2002

(54) DEFORMABLE PLUG FOR USE WITH REDUCED DIAMETER END SHAFTS

(75) Inventors: David A. Galonska, Saginaw; Gary A. Conger, Hemlock, both of MI (US)

(73) Assignee: Arrow Paper Products Company, Saginaw, MI (US)

( * ) Notice: Subject to any disclaimer, the term of this patent is extended or adjusted under 35 U.S.C. 154(b) by 0 days.

(21) Appl. No.: 09/583,414

(22) Filed: May 31, 2000

(51) Int. Cl.$^7$ ................................................ F16L 55/11
(52) U.S. Cl. ........................ 277/616; 277/626; 138/89
(58) Field of Search ................... 277/616, 626, 277/630, 644, 650, 609; 464/180, 181; 138/45, 46, 89

(56) References Cited

U.S. PATENT DOCUMENTS

| | | | |
|---|---|---|---|
| 1,050,557 A | * | 1/1913 | McLaughlin |
| 2,001,166 A | * | 5/1935 | Swennes |
| 2,818,086 A | * | 12/1957 | Foth |
| 3,075,406 A | * | 1/1963 | Butler, Jr. et al. |
| 3,667,640 A | * | 6/1972 | Morrow |
| 3,763,896 A | * | 10/1973 | Horne et al. ................... 138/89 |
| 4,493,344 A | * | 1/1985 | Mathison et al. .............. 138/89 |
| 4,585,033 A | * | 4/1986 | Westman ...................... 138/89 |
| 5,437,309 A | * | 8/1995 | Timmons ...................... 138/89 |
| 5,819,804 A | * | 10/1998 | Ferrer et al. ................... 138/89 |
| 5,918,638 A | * | 7/1999 | Davis ............................ 138/89 |
| 6,257,266 B1 | * | 7/2001 | Valdez ..................... 137/15.08 |

* cited by examiner

Primary Examiner—Anthony Knight
Assistant Examiner—Alison K. Pickard
(74) Attorney, Agent, or Firm—Reising, Ethington, Barnes, Kisselle, Learman & McCulloch, P.C.

(57) ABSTRACT

A plug, for use in sealing the ends of a drive shaft the ends of which have been reduced in diameter, has an annular skirt coupled by a conical web to a central core, the web and the skirt being elastically deformable thereby enabling the plug to collapse radially inwardly as the plug is drawn through the reduced diameter ends of the shaft.

18 Claims, 2 Drawing Sheets

DEFORMABLE PLUG FOR USE WITH REDUCED DIAMETER END SHAFTS

This invention relates to a resiliently deformable plug capable of occupying a sealing position in a shaft having larger and smaller diameter sections, the plug being capable of passing from the larger diameter section through a smaller diameter section.

BACKGROUND OF THE INVENTION

Some automotive drive shafts have a relatively large diameter section portioned between relatively small diameter end sections. Many such shafts require the positioning of a damper in the larger diameter section for absorbing vibrations and attenuating noise. In some instances the ends of the shaft are reduced in diameter by a swaging operation for the purpose of enabling universal joints or other devices to be joined to the reduced diameter ends of the shaft. Normally, the damper is positioned in the shaft prior to the swaging operation. In some cases the damper is formed of paper or other hygroscopic materials.

Following the swaging operation it is conventional to wash the ends of the shaft to remove the swaging compound and to machine the free ends of the shaft to provide them with smooth and planar end surfaces which, in some instances, may be beveled. If the damper is formed of materials which may be damaged by water or chips generated in the machining operation, care should be taken to prevent such damage.

One example of protecting the damper against such damage is disclosed in U.S. Pat. No. 5,976,021. Another example is disclosed in application Ser. No. 09/572,767 filed May 17, 2000. The invention disclosed herein constitutes another approach to protecting the damper against damage.

SUMMARY OF THE INVENTION

Apparatus constructed in accordance with the preferred embodiment of the invention comprises a sealing plug which is capable of being inserted in a drive shaft of the kind that subsequently will have its ends reduced by a swaging operation following which the ends of the shaft will be washed and machined. The plug may be positioned in the shaft inward of or at that part of the shaft that is to be reduced in diameter. In either case, the plug will prevent the passage of any water or chips to the damper and may be withdrawn from the shaft through the reduced diameter ends when the plug no longer is needed.

The plug comprises a central, cylindrical core having a bore therethrough in which is accommodated a force transmitting rod terminating at one end in an eye. Extending laterally and outwardly from the core is a conical web that is joined at its outer end to a cylindrical skirt which encircles the core. The core, the web, and the skirt are formed of closed cell, resiliently deformable foam material which enables the plug to be radially expanded and contracted sufficiently to enable the plug, in its expanded condition, to seal an end of the shaft and be withdrawn, when desired, through the reduced diameter end of such shaft.

A plug constructed in accordance with the invention is capable of use in conjunction with drive shafts of considerably different diameters and is reusable.

THE DRAWING

Apparatus constructed in accordance with the invention is illustrated in the accompanying drawings wherein.

DETAILED DESCRIPTION

Figure 1:
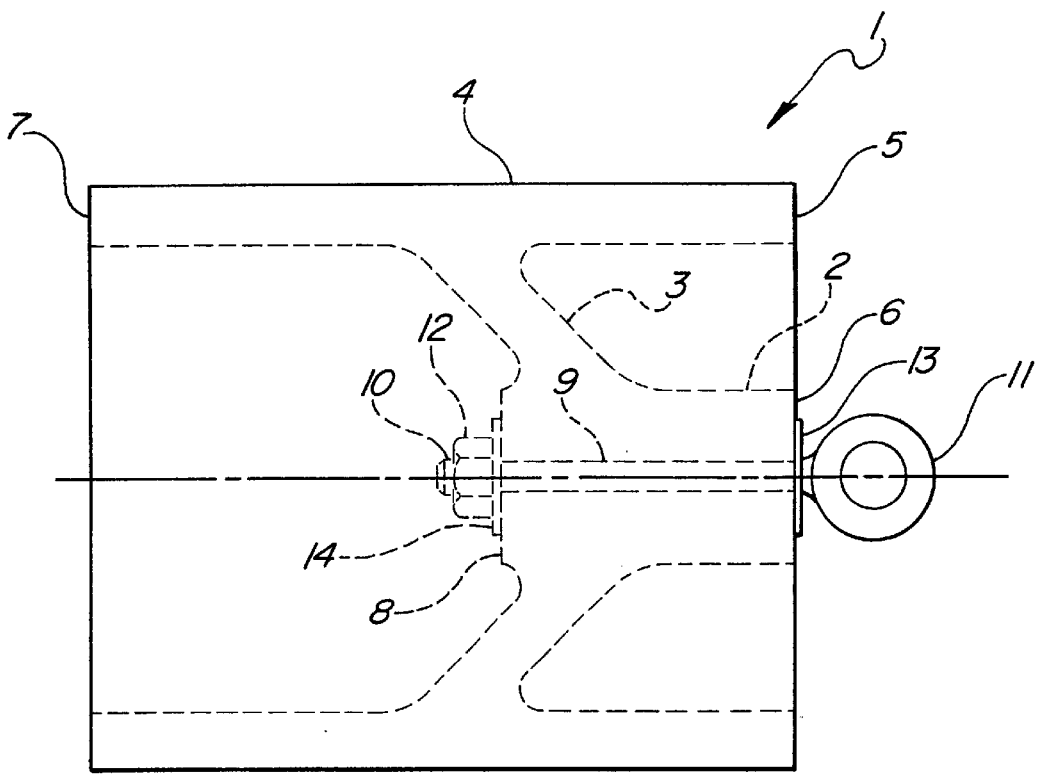
FIG. 1 is a side elevational view of a plug in undeformed condition.
Figure 2:
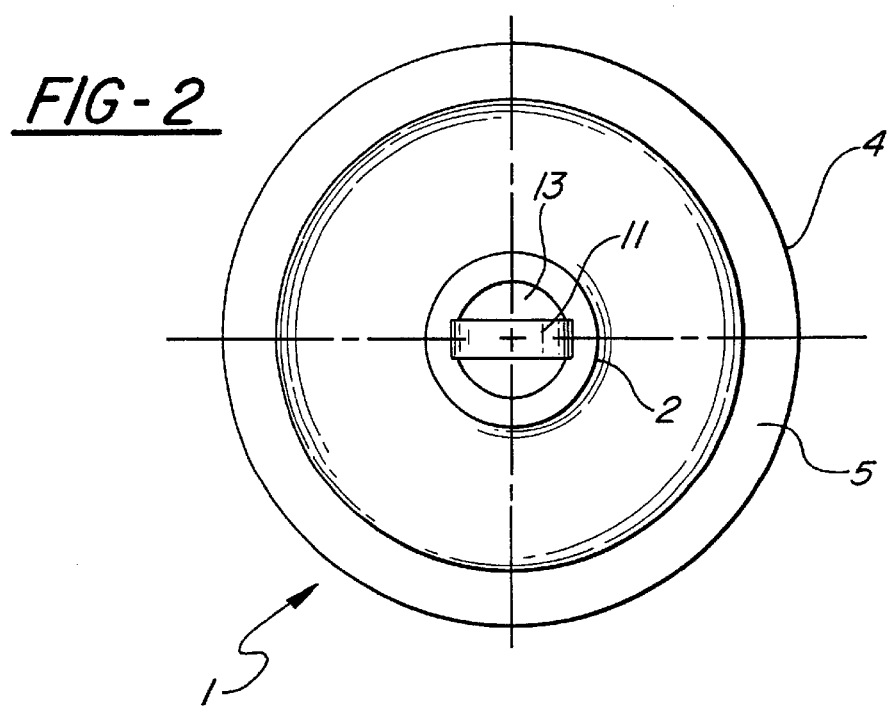
FIG. 2 is an end elevational view of the right hand end of the plug shown in FIG. 1.

A plug formed according to the invention is designated generally by the reference character 1 and comprises a cylindrical core 2 to which is joined the smaller end of a conical web 3 that is joined at its larger outer end to a cylindrical skirt 4 which encircles the core 2 at a uniform distance therefrom. The juncture of the web and the skirt is axially inward from the opposite ends of the skirt. One end 5 of the skirt is coplanar with the corresponding end 6 of the core, whereas the opposite end 7 of the skirt extends well beyond the corresponding end 8 of the core.

The core 2 has a longitudinally extending bore 9 at its center. Sealed in the bore is a force transmitting rod 10 terminating at one end in an eye 11 and being threaded at its opposite end for the accommodation of a nut 12. Washers 13 and 14 are interposed between the eye 11 and the nut 22, respectively, to prevent either the eye or the nut from being pulled through or otherwise damaging the core 2.

The core 2, the web 3, and the skirt 4 preferably are integral with one another and molded from closed cell foam material, such as urethane, so as to be waterproof and elastically deformable. Those parts of the skirt on opposite sides of the juncture of the web and the skirt and adjacent the ends 5 and 7 are deflectable independently of the web 3 and the latter is deflectable so as to enable the diameter of the skirt 4 to be varied.

The length of the skirt 4 is such as to ensure that the plug is stable within the bore of the shaft with the longitudinal axis of the plug and the shaft coincident.

Figure 3:
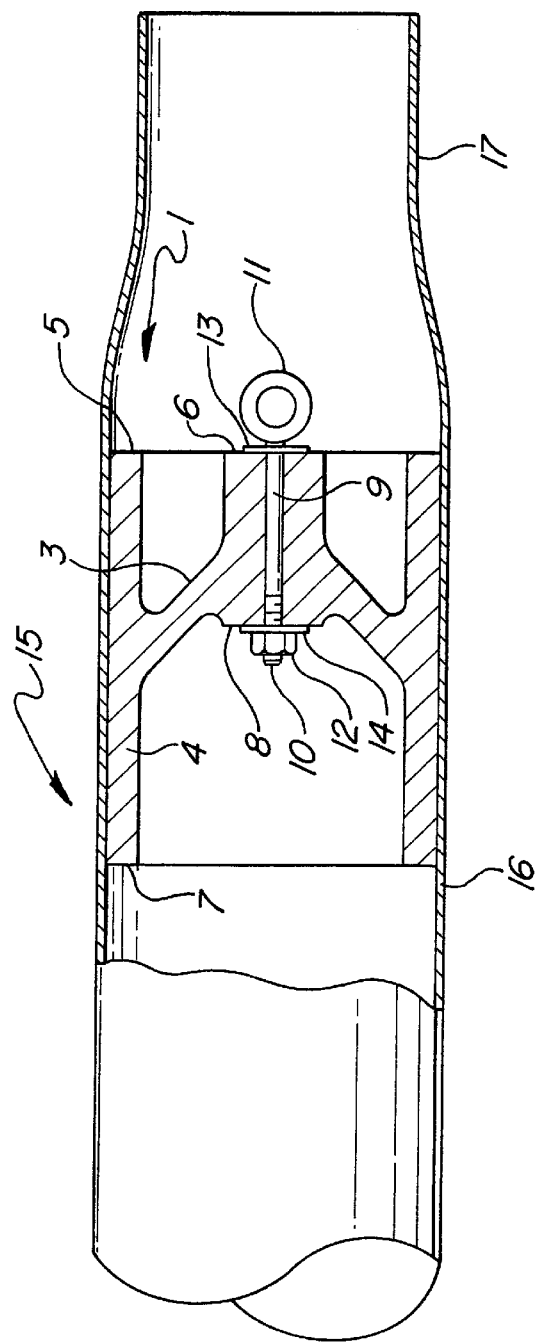
FIG. 3 is a fragmentary view, partly in section, and illustrating a plug installed in a cylindrical shaft one end of which has been reduced in diameter.
Figure 4:
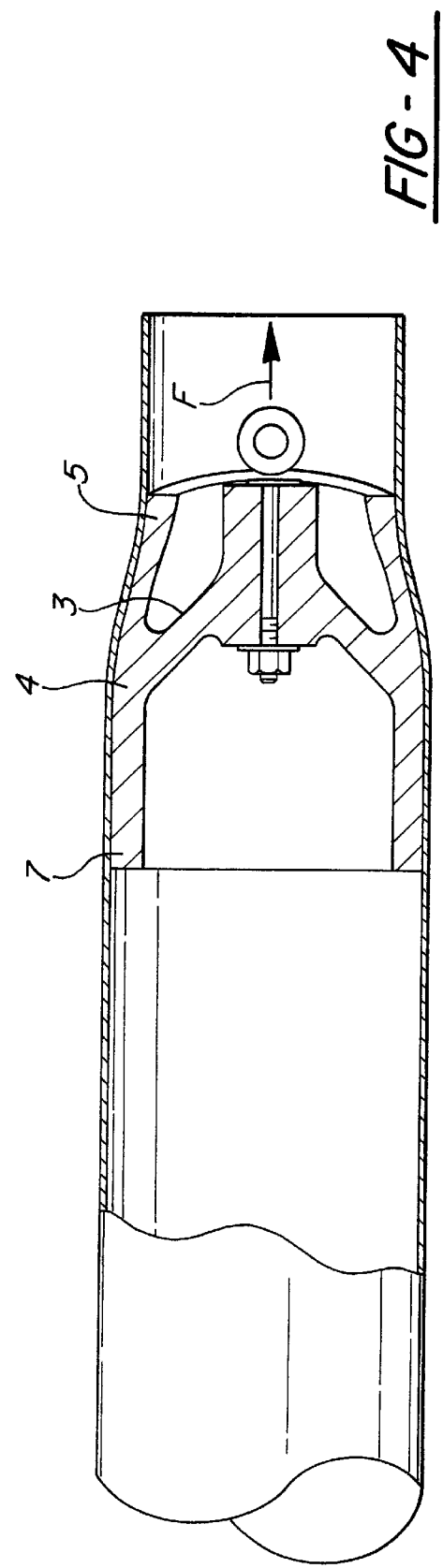
FIG. 4 is a view similar to FIG. 3, but illustrating the plug in the process of being withdrawn from the shaft through its reduced diameter end.

FIGS. 3 and 4 illustrate the plug 1 positioned within a cylindrical drive shaft 15 having a relatively large diameter bore section 16 terminating in a relatively small diameter end section 17, the diameter reduction having been achieved by a conventional swaging process. Although not shown, the larger diameter section 16 will include, at a selected position, a damper which may be of the kind disclosed in U.S. Pat. No. 4,909,361.

It is contemplated that the plug 1 will be installed in the shaft 15 prior to the swaging of the ends thereof. The undeformed diameter of the plug should be greater than the diameter of the bore section 16 so that the plug has an interference fit within the shaft and provides a watertight seal between the plug and the bore of the shaft. During insertion of the plug into the shaft the overall diameter of the plug will be reduced by inward displacement of the web 3. However, the web constantly exerts a radially outward expansive force on the skirt 4 so as constantly to urge the latter into sealing engagement with the surface of the bore.

Following insertion of a plug into each end of the shaft the ends 17 thereof are reduced in diameter by a conventional swaging operation which usually involves applying to the ends of the shaft a lubricant which should be washed from the shaft ends following the swaging operation.

It usually is necessary or desirable to machine the ends of the shaft following the swaging operation so as to ensure that each end occupies a plane normal to the longitudinal axis of the shaft. It also sometimes is desirable to bevel the ends of the shaft.

The presence of the plugs at opposite ends of the shaft not only protects the damper (which occupies a position in the shaft between the two plugs) against contact with water or other washing liquid, but also prevents the passage of chips from the machining operation into engagement with the damper. At the conclusion of the washing and machining operations each plug may be withdrawn from its end of the shaft by attaching a hook (not shown) to the associated eye 11 and applying a force in the direction indicated by the arrow F in FIG. 4 so as to withdraw the plug from the shaft. As the plug approaches the reduced diameter end of the shaft, the end portion 5 of the skirt will be deformed radially inwardly and independently of the skirt end 7, as is shown in FIG. 4. The independent flexing of the skirt ends 5 and 7 is permissable because, except for the web 3, there is a void between the skirt and the core. Further movement of the plug in the direction of the arrow F will cause the web 3 to be displaced inwardly, thereby enabling the end portion 7 of the skirt to contract radially and permit the plug to be removed quite easily from the shaft through the reduced end section thereof.

Following removal of the plug from the shaft, the elasticity of the material from which the plug is formed will enable the plug to return to its undeformed condition for reuse.

The disclosed embodiment is representative of a preferred embodiment of the invention, but is intended to be illustrative rather than definitive thereof. The invention is defined in the claims.

We claim:

1. A plug construction adapted for insertion in a tube, said plug comprising a central core; an annular skirt encircling said core; and a conical web joining said skirt to said core at a juncture inward from opposite ends of said skirt, said web being formed of elastically deformable material enabling said skirt to contract and expand radially.

2. The construction according to claim 1 wherein said core has a bore extending axially therethrough.

3. The construction according to claim 2 including a force transmitting rod extending through said bore.

4. The construction according to claim 3 wherein said rod terminates at one end in an eye.

5. The construction according to claim 4 wherein said one end of said rod is adjacent that end of said conical web which is the smaller.

6. The construction according to claim 1 wherein said core, said skirt, and said web are unitarily molded from closed cell foam material.

7. The construction according to claim 1 wherein one end of said skirt and the corresponding end of said core are substantially coplanar.

8. The construction according to claim 7 wherein the opposite end of said core terminates short of the opposite end of said skirt.

9. The combination according to claim 1 wherein said skirt has a substantially uniform undeformed diameter from end to end.

10. The combination of a hollow, cylindrical shaft having a resiliently deformable plug removably accommodated therein, said shaft having a relatively small diameter at least at one end and a relatively large diameter adjacent said one end, said plug comprising a central core, an annular skirt encircling said core, and a conical web joining said core and said skirt at a juncture between opposite ends of said skirt, said skirt having an undeformed diameter greater than that of said smaller diameter end of said shaft, said web being radially displaceable to enable said plug to pass through said relatively smaller diameter end of said shaft.

11. The construction according to claim 10 including a force transmitting rod secured to said core and having one end thereof extending beyond said core, said one end of said rod terminating in an eye.

12. The combination according to claim 11 wherein except for said web a void exists between said core and said skirt on opposite sides of said juncture.

13. The combination according to claim 12 wherein said skirt has a length greater than that of said core.

14. The combination according to claim 13 wherein one end of said skirt is substantially coplanar with the corresponding end of said core.

15. The combination according to claim 10 wherein said skirt and said web are formed of closed cell foam material.

16. The combination according to claim 10 wherein said core, said web, and said skirt are unitary and integral with one another.

17. The combination according to claim 10 wherein the undeformed diameter of said skirt is greater than the relatively larger diameter of said shaft.

18. The combination according to claim 10 wherein said skirt has a substantially uniform undeformed diameter from end to end.

\* \* \* \* \*